(12) United States Patent
Horwath

(10) Patent No.: US 6,817,569 B1
(45) Date of Patent: Nov. 16, 2004

(54) GUIDANCE SEEKER SYSTEM WITH OPTICALLY TRIGGERED DIVERTER ELEMENTS

(75) Inventor: Tibor G. Horwath, Falmouth, VA (US)

(73) Assignee: General Dynamics Ordnance and Tactical Systems, Inc., St. Petersburg, FL (US)

( * ) Notice: Subject to any disclaimer, the term of this patent is extended or adjusted under 35 U.S.C. 154(b) by 361 days.

(21) Appl. No.: 09/619,949

(22) Filed: Jul. 20, 2000

Related U.S. Application Data

(60) Provisional application No. 60/144,918, filed on Jul. 21, 1999.

(51) Int. Cl.[7] .............................................. F41G 7/26
(52) U.S. Cl. ...................... 244/3.17; 244/3.23; 244/3.22
(58) Field of Search ............................... 244/3.16, 3.17, 244/3.22, 3.21; 250/203.2, 236

(56) References Cited

U.S. PATENT DOCUMENTS

| | | |
|---|---|---|
| 2,931,912 A | 4/1960 | Macleish ..................... 250/203 |
| 3,000,307 A | 9/1961 | Trotter, Jr. |
| 3,021,096 A | 2/1962 | DeMott ......................... 244/14 |
| 3,136,895 A | 6/1964 | Whitney ..................... 250/236 |
| 3,143,654 A | 8/1964 | Aroyan et al. ............. 250/233 |
| 3,323,757 A | 6/1967 | Cole .......................... 244/3.16 |
| 3,332,641 A | 7/1967 | Bezerie ..................... 244/3.12 |
| 4,006,356 A | 2/1977 | Johnson et al. |
| 4,018,405 A | 4/1977 | Baker |
| 4,107,529 A | 8/1978 | Chicklis et al. ............. 250/339 |
| 4,231,533 A | 11/1980 | Durig |
| 4,239,388 A | 12/1980 | Green |
| 4,277,137 A | 7/1981 | Upatnieks et al. |
| 4,286,760 A | 9/1981 | Coudere et al. ........... 244/3.16 |
| 4,408,735 A | 10/1983 | Metz .......................... 244/3.22 |
| 4,427,878 A * | 1/1984 | Buchtel et al. |
| 4,767,934 A | 8/1988 | Stauffer |
| 4,967,065 A | 10/1990 | Edwards .................. 250/203.6 |
| 5,007,736 A | 4/1991 | Daniel et al. |
| 5,056,736 A | 10/1991 | Barton |
| 5,082,201 A | 1/1992 | Le Bars et al. |
| 5,088,659 A | 2/1992 | Neff et al. |
| 5,102,065 A | 4/1992 | Couderc et al. |
| 5,127,604 A | 7/1992 | Klaus, Jr. et al. |
| 5,129,595 A | 7/1992 | Thiede et al. |
| 5,202,743 A | 4/1993 | Lund et al. |
| 5,433,399 A | 7/1995 | Becker et al. |
| 5,456,429 A | 10/1995 | Mayersak |
| 5,529,262 A | 6/1996 | Horwath |
| 5,647,560 A | 7/1997 | Schnatz et al. |
| 5,669,580 A | 9/1997 | Strauss |
| 5,669,581 A | 9/1997 | Ringer |
| 5,835,204 A | 11/1998 | Urbach |
| 5,836,540 A | 11/1998 | Romer et al. |
| 5,870,181 A | 2/1999 | Andressen |
| 5,898,482 A | 4/1999 | Yamabuchi |
| 5,898,483 A | 4/1999 | Flowers |
| 5,936,229 A | 8/1999 | Livingston |
| 6,023,323 A | 2/2000 | Kato et al. |
| 6,076,765 A | 6/2000 | Horwath |

OTHER PUBLICATIONS

Data Sheet No. SCA–006–C–QD, Semicoa Semiconductors, (1 page, 2–sided).

* cited by examiner

Primary Examiner—Charles T. Jordan
Assistant Examiner—T. Dinh
(74) Attorney, Agent, or Firm—Wiggin & Dana LLP; Gregory S. Rosenblatt

(57) ABSTRACT

A guidance seeker system for a projectile includes a plurality of photoconductive sensing elements symmetrically disposed about a central axis of the projectile. When a target is illuminated with a light source, a lens transmits light reflected from the target to one or more of the photoconductive sensing elements. Dependent on which photoconductive sensing element is irradiated, a variance between the line of flight of the projectile and the target is determined. A voltage impulse resulting from irradiation of the photoconductive sensing element triggers actuation of a course corrector, such as a diverter, to nudge the line of flight of the projectile to increase the likelihood of the projectile reaching the desired target. This guidance seeking system is particularly effective when the target is designated with a pulsed laser.

10 Claims, 5 Drawing Sheets

GUIDANCE SEEKER SYSTEM WITH OPTICALLY TRIGGERED DIVERTER ELEMENTS

CROSS REFERENCE TO RELATED PATENT APPLICATION

This Patent Application relates to and claims priority to U.S. Provisional Patent Application, Ser. No. 60/144,918 that was filed on Jul. 21, 1999 and is incorporated in reference in its entirety herein.

BACKGROUND

1. Field of the Invention

This invention relates to a guidance seeker system for projected munitions. More particularly, the munition includes a plurality of photoconductive sensing elements that both enable calculation of a variance between the flight axis of the munition and an illuminated target and trigger at least one on-board diverter to reduce that variance.

2. Description of Related Art

Projected munitions frequently include a guidance seeker system that enables the projectile to calculate a variance from a target and to make one or more in-flight course corrections to increase the likelihood of the projectile disabling or destroying the target. One such guidance seeker system is disclosed in U.S. Pat. No. 5,529,262 by Horwath that discloses a guidance seeker system actuated via a continuous beam of ultraviolet, visible or infrared light. This seeker system includes a reticle with concentric, alternating, bands of light transmitting and light non-transmitting rings. The beam generates pulses as the target moves across the reticle field. The periodisity of these pulses is used to determine deviation of the target from a center line of the reticle. Circumferential thrusters on the projectile are then used to effect a necessary course change.

U.S. Pat. No. 6,076,765 by Horwath utilizes a reticle having a pattern discontinuity effective to generate a singly periodic pulse once each projectile revolution. The periodisity of pulses generated by the target sweeping across the reticle field enables the projectile to determine the line of flight variance between the projectile and the target. The singly periodic pulse enables the projectile to determine its rotation position. Utilizing this information, an appropriate ring diverter is fired to reduce or eliminate the variance.

Both U.S. Pat. No. 5,529,262 and U.S. Pat. No. 5 6,076,765 are incorporated by reference in their entirety herein.

Spinnig reticle-based guidance seeker systems require a constant light source. Throughout this patent application, light is not limited to the visible spectrum, but includes infrared, ultra-violet as well as other portions of the spectrum. Typically, an infrared source on the target is utilized, i.e. a "heat seeking" missile. Such systems where the seeker is drawn to a light source originating on the target are referred to as passive guidance systems.

A semi-active guidance system guides a projectile to a target that is externally illuminated. Typically, external illumination is by a laser beam. The laser generating this laser beam may be mounted on the projectile, or alternatively, located on a separate platform, such as a helicopter or spotter plane. One semi-active guidance seeker system is disclosed in U.S. Pat. No. 5,102,065 to Couderc et al. This patent discloses a homing system utilizing a laser that tracks both a target and a missile. The homing system determines the variance between the two and transmits course correction instructions to the missile that are then effected by small explosive charges or rudder adjustments.

U.S. Pat. No. 5,835,204 to Urbach, that is incorporated by reference in its entirety herein, discloses pulsed laser systems utilized to determine the distance to a target.

The above mentioned guidance seeker systems require a steady state target signal or a steady state illumination signal from a target designator. They may also be amenable to pulsed signals having a repetition rate much faster than the highest frequency signal generated by the seekers.

To reduce the power required, and therefore the size and cost of laser designators, it is desired for the laser designator to be a low repetition rate laser that generates pulse sequences too slow for the operation of the prior art guidance seekers. There remains, therefore, a need for a guidance seeker system effective for use with low repetition rate pulse lasers that may be utilized with either spinning projectiles or nonspinning projectiles.

SUMMARY OF THE INVENTION

Accordingly, it is an object of the invention to provide a guidance seeker system useful to guide missiles or other projected munitions to a target.

It is a feature of the invention that the guidance seeker system is useful with both pulsed and nonpulsed target designators and with both spinning and nonspinning projectiles. Another feature of the invention is that the guidance seeker system includes an optics package having a plurality of photoconductive sensing elements. These photoconductive sensing elements are electrically coupled to one or more diverters that are disposed about an exterior surface of the projectile. Selective firing of diverters guides the projectile to the target. Another feature of the invention is that the optics package includes a lens system that transmits the target designator beam to the photoconductive sensing elements as either a focused spot or as a defocused spot.

It is an advantage of the invention that the guidance seeker system is useful with target designators that generate beams of short pulses with slow pulse repetition rates and may be used to discern coded laser pulses. Another advantage of the guidance seeker system of the invention is that it calculates and corrects for variance from a target utilizing a focused beam. When used in a defocused beam mode, the seeker system determines and corrects for both variance and projectile rotation. Still another advantage of the invention is that in certain embodiments, the guidance seeker system includes a recirculating shift register that compensates for a prefired or otherwise inactive diverter.

In accordance with the invention, there is provided a guidance seeker system effective to guide a projectile to a target comprising an optics package disposed at a forward end of the projectile. The optics package includes a plurality of photoconductive sensing elements and has a lens disposed between the target and the photoconductive sensing elements at a distance, D, from the photoconductive sensing elements. A plurality of course diverters are mounted on an exterior surface of the projectile wherein illumination of one or more of the photoconductive sensing elements causes the plurality of course diverters to reduce a variance between a present flight path of the projectile and the target.

The above stated objects, features and advantages will become more apparent from the specifications and drawings that follow.

IN THE DRAWING

FIG. 1 graphically illustrates short duration, low repetition rate, pulses generated by a laser designator.

FIG. 2 graphically illustrates coding of laser pulses.

FIG. 3 graphically illustrates a portion of the optics associated with the guidance seeker system of the present invention.

Figure 7:
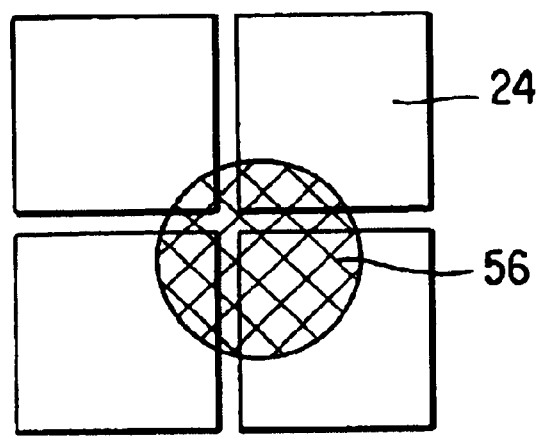
FIG. 7 illustrates the application of a defocused target designator beam in accordance with the invention.
Figure 8:
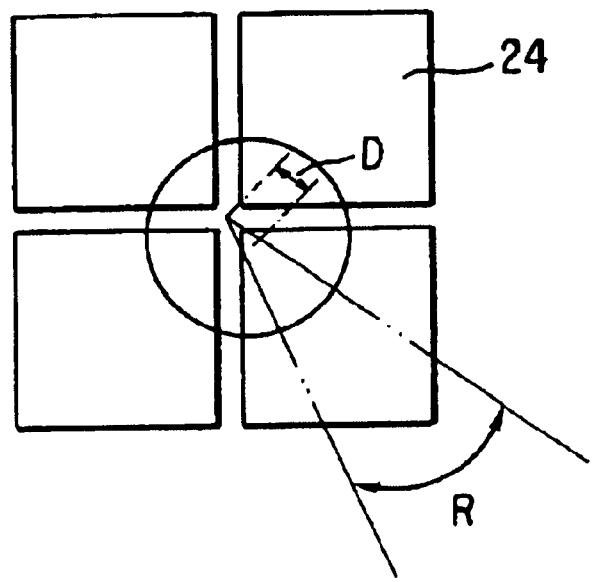

FIG. 8 graphically illustrates the information obtained from the defocused target beam of FIG. 7.

Figure 9:
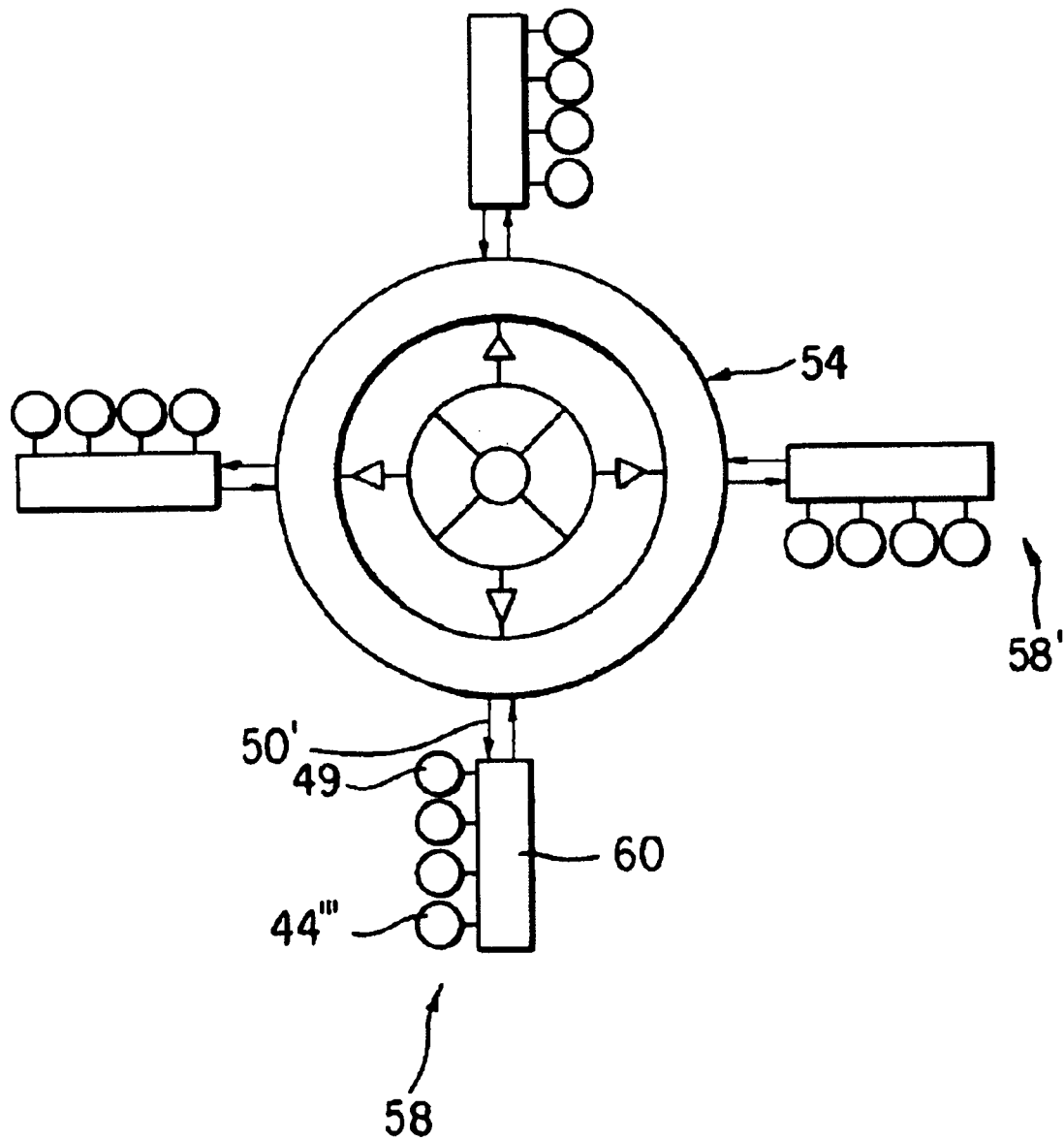

FIG. 9 illustrates the relationship between a plurality of photoconductive sensing elements and a plurality of course diverters for a nonspinning projectile.

DETAILED DESCRIPTION

While the guidance seeker system of the invention is described with particular emphasis on projected munitions whereby the projectile includes an explosive charge that is intended to detonate either on contact with a target or proximate to the target thereby disabling or destroying that target, the guidance seeker system is equally applicable to nondestructive applications where it is desirable to direct a projectile to a desired target.

Figure 1:
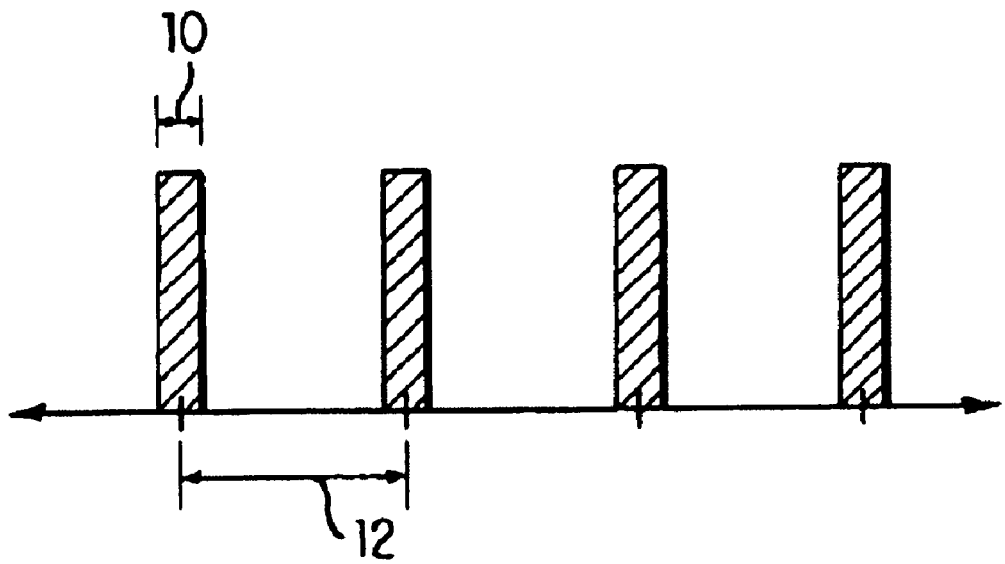

One method of identifying a target, referred to as semi-active target designation, illuminates the target with an external light source. This is referred to as "designating" the target and the light source referred to as the "designator." A guidance seeker system on-board a projectile locates the illuminated target and directs the projectile to that target. A highly focused coherent beam of light, such as a beam generated by a laser, is particularly useful for target designation. To minimize the power output required to power the laser, thereby reducing cost and laser size and weight, it is preferable for the laser to generate short duration pulses at a relatively slow repetition rate. With reference to FIG. 1, an exemplary pulse duration 10 is between about 15 nanoseconds and 100 nanoseconds. The pulse spacing 12 is from about 0.033 seconds to about 0.05 seconds, generating between about 20 and 30 pulses per second (ie. a pulse frequency of between 20 Hertz and 30 Hertz).

Figure 2:
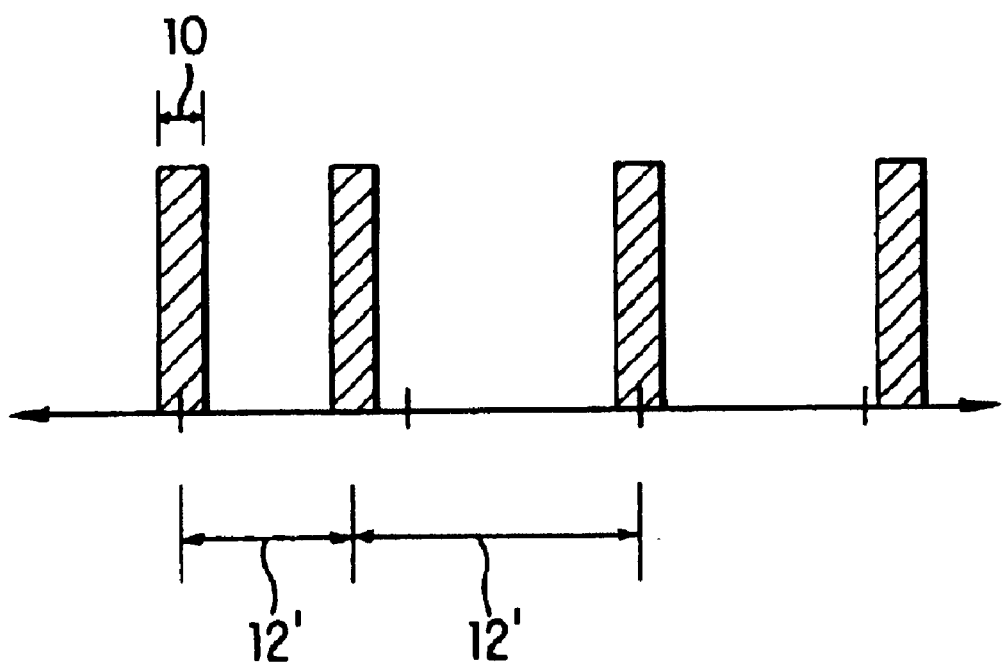

To prevent an enemy from generating false designator spots to mislead the guidance seeker system, the laser pulses may be coded as illustrated in FIG. 2. While the pulse duration 10 remains substantially constant, the pulse spacing $12^1$ is varied according to a pre-set code. The guidance seeker may contain a logic circuit programmed to recognize and respond to the pre-set code and to ignore designator signals not corresponding to that code.

Any laser capable of generating pulses meeting the above requirements may be utilized. One preferred laser is a neodymium/YAG (yttrium, aluminum, garnet) laser.

Figure 3:
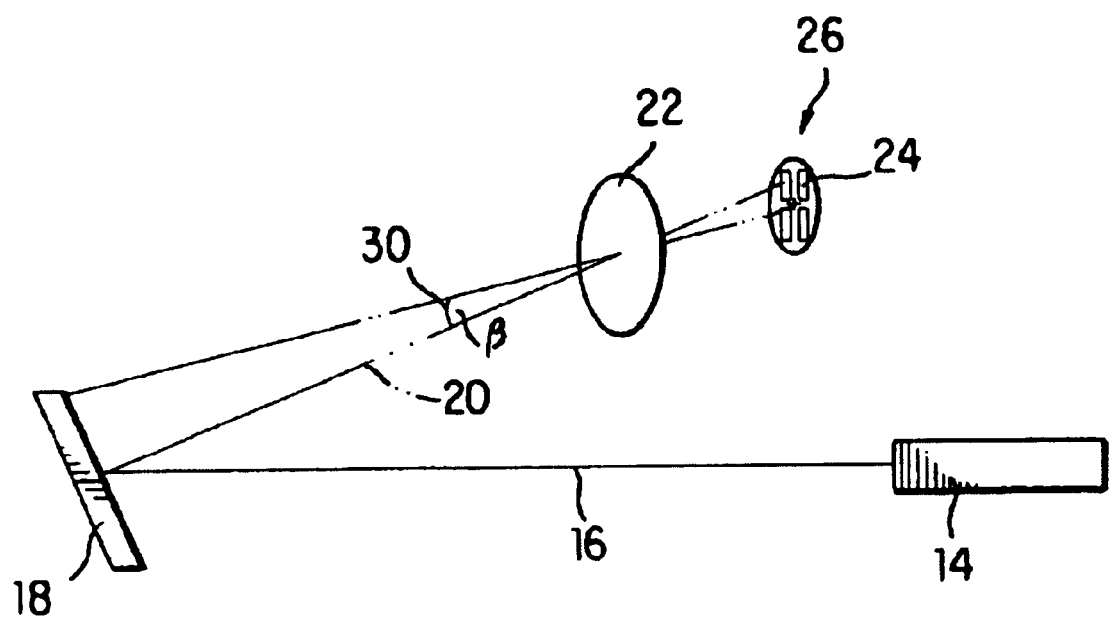

With reference to FIG. 3, the laser 14 is preferably mounted on a platform other than the projectile. For example, the laser 14 may be mounted on a helicopter or spotting aircraft. The laser 14 generates a pulsed beam 16 that is reflected from a target 18. A reflected pulse 20 is collected by lens 22 and transmitted onto at least one of a plurality of photoconductive sensing elements 24 contained within a photodetector 26.

Figure 4:
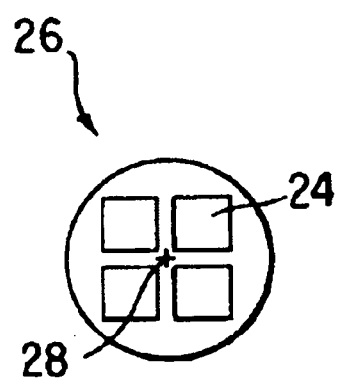
FIG. 4 is a top planner view of a photodetector containing a plurality of photoconductive sensing elements useful with the guidance seeker system of the invention.

With reference to FIG. 4, the photoconductive sensing elements 24 are preferably symmetrically disposed about a central axis 28 of the photo detector 26. The central axis 28 is aligned with the line of flight of the projectile, such that if the line of flight is aligned with the line of the reflected pulse, the reflected pulse strikes the central axis and does not strike any one of the photoconductive sensing elements thereby indicating that no course correction is required. However, with reference back to FIG. 3, if there is a variance 30 that exceeds a predefined minimum variance, reflected pulse 20 strikes at least one photoconductive sensing element. Illumination of the photoconductive sensing element 24 generates an electric pulse that effects a projectile course correction.

Referring back to FIG. 4, a suitable photodetector typically includes at least four photoconductive sensing elements 24 and may include up to about 20 symmetrically arranged about the central axis 28. Typically, a metal casing, such as a TO-39 case, not shown, supports the photodetector 26 and functions as a common cathode. Each of the photoconductive sensing elements 24 has its own anode. The photoconductive sensing elements are typically non-conductive, but become electrically conductive when irradiated with a laser pulse. The voltage transmitted through a photoconductive sensing element when irradiated is a function of light intensity and generally ranges up to about 1.2 volts. Therefore, by determining which of the photoconductive sensing elements is electrically conductive, the position of the reflected pulse is determined. One suitable photodetector is manufactured by Semicoa Semiconductors of Costa Mesa, Calif.

Figure 5:
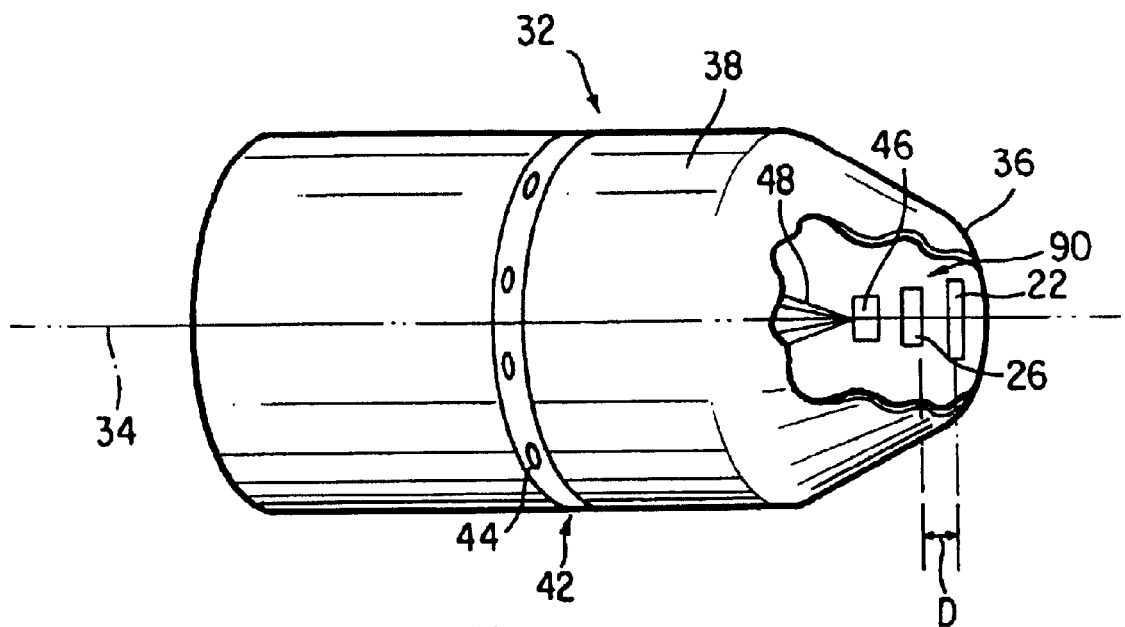
FIG. 5 is a perspective, and partially broken, view of a projectile employing the guidance seeker system of the present invention.

FIG. 5 is a perspective, and partially broken, view of a projectile 32 employing the guidance seeker system of the present invention. The projectile 32 is generally symmetrically disposed about a central axis 34 that also constitutes the line of flight of the projectile. The projectile 32 is expelled from a gun barrel, mortar, cannon, or other suitable means with an aerodynamically shaped forward end 36 leading the projectile in flight. The projectile has a metallic housing 38 that contains an explosive, a detonator, and an optics package 40. The optics package 40 is mounted at the forward end 36 of the projectile. Mounted on an exterior surface of the metallic housing 38 are a plurality of course correctors 42. In one embodiment, as illustrated in FIG. 5, the course correctors are a plurality of diverter elements 44 encircling the center of gravity of the projectile 32. Typically, there will be from about 4 to about 200 diverters symmetrically disposed about the center of gravity. Each diverter is a small, on the order of one gram charge, explosive that when detonated creates an impulse that nudges the projectile to change the line of flight to one more likely to impact the target. Typically, from detonation of one diverter until the projectile is ready for a second course correction is on the order of 0.100 seconds.

An exemplary number of diverters for a 2.75 inch rocket is from about 16 to 32.

While diverters are a preferred course corrector for the projectiles, other course correctors such as small thrusters or rudders may also be employed with the invention.

The photodetector 26 is mounted rearward, relative to the forward end 36, of the lens 22 such that lens 22 is disposed between the target and the photo-detector 26. A distance, D, between the lens 22 and photodetector 26 may be equal to the focal length of that lens, for a focused beam embodiment or may be a distance other than the focal length for a defocused beam.

A typical focal length for lenses utilized with the optics package of the invention is one centimeter. Utilizing the lens equations:

$$1/d_o + 1/d_i = 1/f$$

$$d_i = d_o f/d_o - f$$

where: $d_o$=distance to object,
  $d_i$=distance to image from lens axis, and
  f=focal length where at $\infty d_i = f$,
it may be seen that the focal length remains substantially constant at target distances ranging from 30 feet to infinity. In view of the high speed of projectile travel, it is unlikely that a course correction will be effected when the projectile is within 30 feet of the target.

Output signals from the photoconductive elements mounted on photodetector 26 are pre-amplified and conditioned by electronics package 46 and then applied to the appropriate filing circuit associated with a desired diverter 44. Wires 48 may be utilized to transmit the output signal to the appropriate firing circuit.

Figure 6:
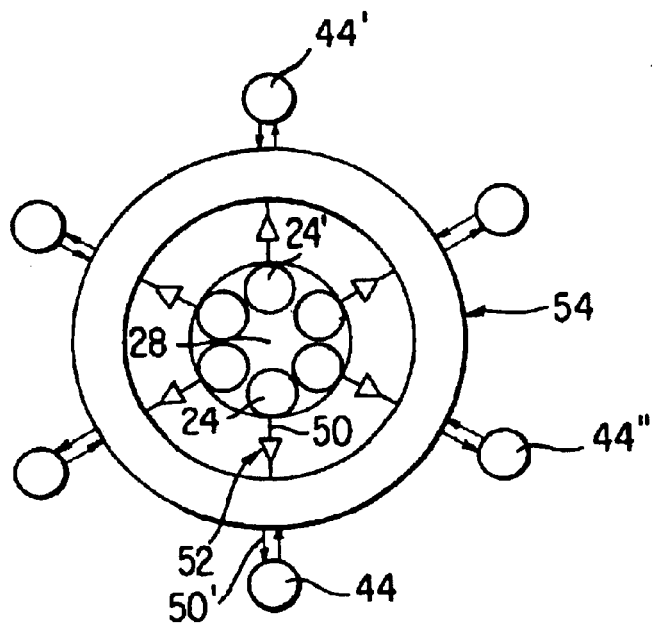
FIG. 6 illustrates the interaction between a plurality of photoconductive sensing elements and a plurality of course diverters in accordance with the invention.

The projectile 32 may be either a spinning projectile or a non-spinning projectile. If a spinning projectile, the rate of spin is typically on the order of 1000 revolutions per second. With reference now to FIG. 6, output signals 50 from the photoconductive sensing elements 24, are typically voltage pulses having a voltage on the order of millivolts. The output signals 50 are passed through an amplifier 52 where the signal is pre-amplified and conditioned to 100 millivolts.

A recirculating shift register 54 is clocked to a frequency, f, that is a multiple of the spin frequency of the projectile. A multiplication factor, n, is equal to the number of photoconductive sensing elements in the ring. Shift register 54 transmits the conditioned output signal $50^1$ via an appropriate firing circuit to the diverter 44 aligned with an irradiated photoconductive sensing element 24. Generation of the firing pulse and activation of the diverter occurs almost instantaneously and is effective to nudge the projectile to a line of flight closer to the target. It is anticipated that the next laser impacting the photodetector will strike closer to central axis 28.

A single nudging of the projectile may not be effective to align the projectile with the target, or the target may be moving such that additional course corrections are required. Irradiation of another photoconductive sensing element $24^1$ is effective to actuate another diverter $44^1$ to again nudge the projectile in the appropriate direction. However, it is possible that photoconductive sensing element 24 will be irradiated a second time. Diverter 44 has already been fired and is now inactive. In that event, or if diverter 44 has been deemed defective, the shift register delays transmission of amplified signal 52 for a time equal to f/n whereby next available diverter $44^{11}$ has rotated to the original position of diverter 44. This step can be repeated if the neighboring diverter element is also spent until a live element is encountered. The shift register 54 thus accomplishes electronic derotation of the frame of reference assuring that steering impulses are always directed properly.

A focused designator beam applies a high intensity of light to a single photoconductive sensing element generating a high voltage pulse from that element. With reference to FIG. 5, in some alternative embodiments it is desirable that D not equal the focal length of lens 22. In this instance, as illustrated in FIG. 7, photoconductive sensing elements 24 are irradiated with a defocused beam 56. Defocused beam 56 is sufficiently large to irradiate a plurality of photoconductive sensing elements 24.

With reference to FIG. 8, the voltage passed through each of photoconductive sensing elements 24 is proportional to the intensity of the irradiating beam and the larger the surface area of a specific photoconductive sensing element irradiated, the larger the voltage output from that photoconductive sensing element. In this way, both the divergence, D, of the projectile from the target axis and the angle of rotation, R, between the projectile and the target may be determined. Knowledge of the angle of rotation is useful because it specifies the direction of the divert impulse.

Certain projectiles, for example those for armor piercing, are not spinning. The guidance seeker system of the invention is useful with these projectiles as well. With reference to FIG. 9, individual diverters are replaced with a linear array of diverter elements 58. Individual diverters 44 contained within the linear array of diverters 58 are driven by linear shift register 60. The linear shift register 60 transfers conditioned output signals $50^1$ from recirculating shift register 54 from one diverter 44 in the linear array to the next. Last to be fired diverter element $44^{111}$ that may be any one of the diverter elements within the linear array 58 and includes a slight skew in its impulse vector to introduce a slight spin into the projectile. Recirculating shift to the next array of diverters $58^1$ thus only occurs when all diverters in a particular array have been exhausted.

While this configuration is particularly suitable for non-spinning projectiles, it may be utilized with spinning projectiles as well.

It is apparent that there has been provided in accordance with the invention a guidance seeker system utilizing optically triggered diverter elements that fully satisfies the objects, features and advantages disclosed hereinabove. While disclosed in accordance with specific embodiments of the invention, it is apparent that many alternatives, modifications and variations are equally applicable to the invention and these alternatives, modifications and variations are equally encompassed within the scope of the claims that follow.

What is claimed is:

1. A guidance seeker system effective to guide a projectile to a target, comprising:
   an optics package disposed at a forward end of said projectile, said optics package including a plurality of photoconductive sensing elements disposed on and symmetrically disposed about a common axis aligned with a line of flight of said projectile, said common axis being free of photoconductive sensing elements, a lens disposed between said target and said photoconductive sensing elements at a distance, D, from said photoconductive sensing elements;
   a plurality of course correctors mounted on an exterior surface of said projectile wherein illumination of one or more of said photoconductive sensing elements causes said plurality of course correctors to reduce a variance between a present flight path of said projectile and said target; and
   a recirculating shift register disposed between said photoconductive sensing elements and said course correctors clocked to a frequency of F×N where F is a multiple of the spin frequency of said projectile and N is the number of photoconductive sensing elements.

2. The guidance seeker system of claim 1 wherein D is substantially equal to a focal length of said lens.

3. The guidance seeker system of claim 2 wherein each photoconductive sensing element is associated with a linear array containing a plurality of course correcting diverters.

4. The guidance seeker system of claim 3 wherein at least one of said plurality of course correcting diverters has a skew in its impulse vector effective to induce projectile spin.

5. The guidance seeker system of claim 1 wherein D is substantially unequal to a focal length of said lens.

6. The guidance seeker system of claim 5 wherein each photoconductive sensing element is associated with a linear array containing a plurality of course correcting diverters.

7. The guidance seeker system of claim 6 wherein at least one of said plurality of course correcting diverters has a skew in its impulse vector effective to induce projectile spin.

8. A method to effect a course correction in a projectile comprising the steps of:
   providing said projectile with a plurality of photoconductive sensing elements symmetrically disposed about a common axis, said common axis being aligned with a line of flight of said projectile;
   irradiating a target with a designating light generated by a pulsed laser whereby said laser pulse duration is substantially shorter than an interval between said laser pulses;
   receiving pulsed designating light reflected from said target on one or more of said photoconductive sensing elements; and
   transmitting a voltage pulse from said one or more photoconductive sensing elements to actuate at least one course corrector appended to said projectile, thereby effecting a course correction, wherein a recirculating shift register is disposed between said photoconductive sensing elements and said at least one course corrector whereby if a selected one of said at least one course corrector is inactive, actuation is delayed until a different one of said at least one course correctors is effective to effect said course correction.

9. A method to effect a course correction in a projectile comprising the steps of:
   providing said projectile with a plurality of photoconductive sensing elements symmetrically disposed about a common axis, said common axis being aligned with a line of flight of said projectile;
   irradiating a target with a designating light generated by a pulsed laser whereby said laser pulse duration is substantially shorter than an interval between said laser pulses;
   receiving pulsed designating light reflected from said target on said photoconductive sensing elements;
   focusing said laser pulses to impact a single one of said photoconductive sensing elements at one time; and
   transmitting a voltage pulse from said one of said photoconductive sensing elements to actuate at least one course corrector appended to said projectile, thereby effecting a course correction.

10. A method to effect a course correction in a projectile comprising the steps of:
   providing said projectile with a plurality of photoconductive sensing elements symmetrically disposed about a common axis, said common axis being aligned with a line of flight of said projectile;
   irradiating a target with a designating light generated by a pulsed laser whereby said laser pulse duration is substantially shorter than an interval between said laser pulses;
   receiving pulsed designating light reflected from said target on one or more of said photoconductive sensing elements;
   defocusing said laser pulses to impact multiple single ones of said photoconductive sensing elements at one time; and
   transmitting a voltage pulse from said multiple single one of said photoconductive sensing elements to actuate at least one course corrector appended to said projectile, thereby effecting a course correction.

* * * * *